United States Patent [19] [11] 4,072,368
Ehrentraut [45] Feb. 7, 1978

[54] SLIDING-SURFACE BEARING AND PROCESS OF MANUFACTURING THE SAME

[75] Inventor: Otto Ehrentraut, Gmuden, Austria

[73] Assignee: Miba Gleitlager Aktiengesellschaft, Laakirchen, Austria

[21] Appl. No.: 724,397

[22] Filed: Sept. 17, 1976

[30] Foreign Application Priority Data

Sept. 24, 1975 Austria .................................. 7329/75

[51] Int. Cl.² ............................................. F16C 17/00
[52] U.S. Cl. ..................................... 308/3 R; 308/241
[58] Field of Search .................... 308/3 R, 237 R, 239, 308/241, DIG. 8

[56] References Cited

U.S. PATENT DOCUMENTS

| | | | |
|---|---|---|---|
| 3,343,362 | 9/1967 | Lunsford | 308/241 X |
| 3,359,046 | 12/1967 | Dryden | 308/241 X |
| 3,522,974 | 8/1970 | Polti | 308/241 X |
| 3,853,602 | 12/1974 | Nakamura | 308/241 X |

Primary Examiner—Joseph F. Peters, Jr.
Assistant Examiner—Gene A. Church
Attorney, Agent, or Firm—Kurt Kelman

[57] ABSTRACT

The bearing comprises a bearing metal layer, a sliding-surface layer consisting of a lead alloy which contains copper and tin, and an additional layer which is disposed between said bearing metal layer and said sliding-surface layer and adjoins the latter and consists of a lead-copper alloy which is initially free from tin. Any tin which is subsequently contained in said additional layer is completely bonded to said copper in said additional layer in the form of a copper-tin phase. In the manufacture of the bearing, the sliding-surface layer is applied to said additional layer when the latter is free from tin and the bearing may be subjected to a heat treatment at an elevated temperature below 183° whereby tin from said sliding-surface layer is caused to enter said initially tin-free additional layer and to be bonded to copper in said additional layer in the form of a copper-tin phase.

13 Claims, 1 Drawing Figure

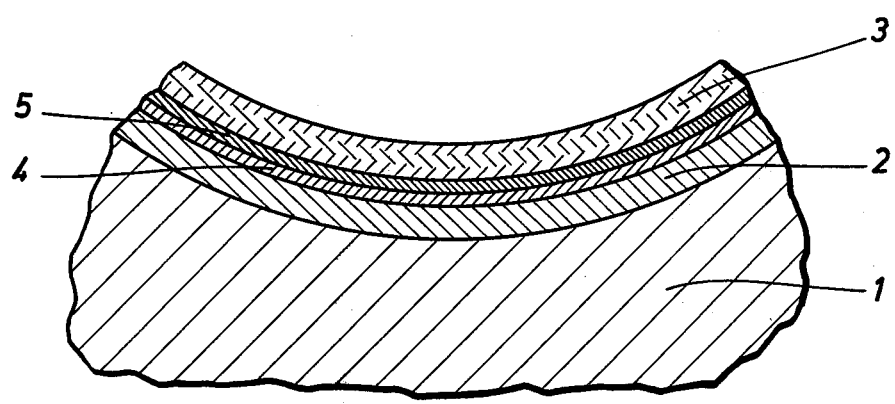

SLIDING-SURFACE BEARING AND PROCESS OF MANUFACTURING THE SAME

This invention relates to a sliding-surface bearing which comprises a bearing metal layer consisting of a copper or light alloy, a sliding-surface layer consisting of a lead alloy which contains copper and tin, and, if desired, an intermediate layer. The invention relates also to a process of manufacturing such sliding-surface bearing.

Modern high-duty bearings have usually a supporting shell of steel, which imparts the required strength to the bearing. The supporting shell of steel is lined with a bearing metal layer and may be omitted if the bearing metal layer itself has an adequate strength. The sliding-surface layer is usually an electrodeposited layer consisting of a lead-tin-copper alloy.

When the bearing metal layer of such bearings consists of a copper-base alloy, tin will diffuse from the sliding-surface layer into the bearing metal layer during an operation of the bearing at elevated temperature because sliding-surface layers which contain tin and have been applied to copper, copper alloys, nickel or nickel alloys tend to segregate under the action of heat. This diffusion of tin into the bearing metal layer reduces the resistance of the sliding-surface layer to corrosion and results in the formation of brittle copper-tin phases in the transition zone so that the sliding-surface layer can become detached under severe conditions of operation.

It is already known to coat the bearing metal layer with an intermediate layer consisting of an iron group metal or copper or brass or another copper alloy before the sliding-surface layer is applied. Whereas such intermediate layers may be able to prevent a formation of disturbing brittle phases in the transition zone it has been found that they cannot prevent a migration of tin from the sliding-surface layer but can only retard such migration so that a tin-enriched zone is formed in the sliding-surface layer near the interface between the sliding-surface layer and the intermediate layer. The thickness and the eutectic content (melting point) of this tin-enriched zone increase with the temperature rise and the duration of the action of the elevated temperature. Owing to its increased eutectic content (melting point 183° C), this tin-enriched zone has only a low high-temperature hardness. Under extreme conditions of operation the temperature of the tin-enriched zone may rise above the melting point of said eutectic so that the tin-enriched zone is incipiently melted and the bearing suffers severe damage by a destruction of the sliding-surface layer.

The same disadvantage arises in sliding-surface bearings having a bearing metal layer which consists of a light alloy. In such bearings the intermediate layer is not required to prevent a diffusion of tin but as a covering layer for the protection of the light alloy from the attack of the electrolyte from which the sliding-surface layer is deposited. Nevertheless, the problems involved in an enrichment of tin arise too because the intermediate layer does not entirely inhibit a diffusion of tin.

It has already been attempted to prevent a migration of tin by the use of a sliding-surface layer which has a higher copper content (printed German application No. 1,077,026). Even when the copper content of such sliding-surface layer is not uniform throughout the thickness of the sliding-surface layer, the desired result cannot be produced whether or not an additional intermediate nickel layer is provided. It has been observed in either case that the action of heat causes part of the tin contained in the sliding-surface layer to deposit on the lead-bronze layer or on the intermediate layer. Depending on the specific action of heat, tin from a thicker or thinner zone of the sliding-surface layer near the intermediate layer will migrate toward the intermediate layer and only the tin in the overlying zone of the sliding-suface layer is retained in the sliding-surface layer because said tin is bonded in a copper-tin phase which inhibits diffusion.

Austrian Patent No. 323,477 describes a sliding-surface bearing which comprises a bearing metal layer consisting of a copper alloy or light alloy, an intermediate layer, and a sliding-surface layer which consists of lead, tin, and copper and has been applied to the intermediate layer. Said sliding-surface layer consists of a plurality of superimposed zones which have abruptly changing copper contents. It has been claimed that this feature results in a diffusion zone which is so thin and has such a low tin content that disturbing results no longer arise because the composite sliding-surface layer comprises a plurality of diffusion-promoting interfaces between zones differing in copper content so that the enrichment of tin at each interface is decreased to an innocuous extent. It is apparent that even this arrangement does not permit of a complete suppression of diffusion.

It is an object of the invention to eliminate all these disadvantages and to provide a sliding-surface bearing which is of the kind described first hereinbefore and in which a disturbing enriching of tin at the interface between the sliding-surface layer and the bearing metal layer, or between the sliding-surface layer and the intermediate layer, is reliably prevented even under extreme conditions of operation.

This object is accomplished according to the invention in that a layer consisting of a lead-copper alloy which is initially free from tin is provided between the sliding-surface layer, on the one hand, and the bearing metal layer or intermediate layer, on the other hand.

As a result, a zone which is entirely free from tin is initially provided between the sliding-surface layer consisting of a copper-tin alloy, on the one hand, and the bearing metal layer or the intermediate layer, on the other hand, so that the tin which migrates from the sliding-surface layer toward the bearing metal layer or the intermediate layer is bonded to the copper in the adjacent tin-free layer before the tin can migrate to the interface defined by the bearing metal layer or the intermediate layer. Any existing intermediate layer need no longer control the previously expected diffusion and for this reason can be optimally designed for its other functions.

According to a further feature of the invention the sliding-surface layer consists in known manner of sublayers having changing copper and/or tin contents. For this reason, tin is inherently present only in a relatively small quantity, which migrates toward the bearing metal layer or intermediate layer and is reliably bonded to the copper in the layer consisting of an initially tin-free lead-copper alloy which is provided in accordance with the invention.

In accordance with the invention the total quantity of copper in the copper-containing layers, preferably in the sliding-surface layer and the initially tin-free layer, is at least as large as the quantity of copper required to bond in a copper-tin phase the total quantity of tin initially contained in the sliding-surface layer so that free tin cannot appear in the endangered transition zone. It will be understood that a much higher total copper content may be selected when this is necessary or desirable for other reasons.

In the process according to the invention for the manufacture of the described sliding-surface bearing, the bearing provided with all layers is subjected to a preferably shocklike heat treatment at a temperature below 183° C before it is installed. It has been found that the migration or diffusion of tin takes place at much lower temperatures than the bonding of tin to the existing copper. For this reason, as an excessively slow or insufficient temperature rise of the bearing is to be expected under normal conditions of operation of installed bearings, there is a risk that tin may migrate to the interface between the initially tin-free layer, on the one hand, and the bearing metal layer or intermediate layer, on the other hand, and may become enriched there before the tin is bonded in the layer consisting of an initially tin-free lead-copper alloy. If the bearing is subjected as soon as possible after the provision of all layers to a preferably shocklike heat treatment which is effected before the installation of the bearing and results immediately in the formation of the diffusion-inhibiting copper-tin phase, all tin will be bonded to the copper before tin can become enriched near the endangered interface. A temperature of 183° must not be exceeded to avoid an incipient melting of the sliding-surface layer.

An embodiment of a sliding-surface bearing is highly diagrammatically shown in a transverse sectional view on the accompanying drawing.

A supporting shell 1 is provided, which consists of steel and imparts the required strength to the bearing. The shell 1 is covered by a bearing metal layer 2, which consists of a copper alloy or a light alloy. An intermediate layer 4 is provided on the bearing metal layer 2 and consists of an iron group metal but may alternatively consist of copper or of brass or another copper alloy. The intermediate layer 4 is covered according to the invention by an additional layer 5, which consists of a lead-copper alloy which is initially free of tin. The additional layer 5 is covered by a sliding-surface layer 3, which consists of three sublayers having different copper and/or tin contents.

The intermediate layer 4 might be omitted. In that case the additional layer is provided directly on the bearing metal layer 2.

What is claimed is:

1. A sliding-surface bearing which comprises
a bearing metal layer,
a sliding-surface layer consisting of a lead alloy which contains copper and tin, and
an additional layer which is disposed between said bearing metal layer and said sliding-surface layer and adjoins the latter and consists of a lead-copper alloy which is initially free from tin.

2. A sliding-surface bearing as set forth in claim 1, in which said bearing metal layer consists of a copper alloy.

3. A sliding-surface bearing as set forth in claim 1, in which said bearing metal layer consists of a light alloy.

4. A sliding-surface bearing as set forth in claim 1, which comprises an intermediate layer between said bearing metal layer and said additional layer.

5. A sliding-surface bearing as set forth in claim 4, in which said bearing metal layer, said sliding-surface layer, said additional layer, and said intermediate layer contain copper in a total quantity which is sufficient to bond in the form of a copper-tin phase the total quantity of tin initially contained in said sliding-surface layer.

6. A sliding-surface bearing as set forth in claim 1, in which said sliding-surface layer comprises a plurality of sublayers differing in copper content.

7. A sliding-surface bearing as set forth in claim 1, in which said sliding-surface layer comprises a plurality of sublayers differing in tin content.

8. A sliding-surface bearing as set forth in claim 1, in which said bearing metal layer, said sliding-surface layer, and said additional layer contain copper in a total quantity which is sufficient to bond in the form a copper-tin phase the total quantity of tin initially contained in said sliding-surface layer.

9. A sliding-surface bearing as set forth in claim 1, in which said sliding-surface layer and said additional layer contain copper in a total quantity which is sufficient to bond in the form of a copper-tin phase the total quantity of tin initially contained in said sliding-surface layer.

10. A sliding-surface bearing as set forth in claim 1, the bearing being subjected to a heat treatment at an elevated temperature below 183° C before installation.

11. A sliding-surface bearing as set forth in claim 10, wherein the bearing is subjected to a shocklike heat treatment.

12. A sliding-surface bearing which comprises
a bearing metal layer,
a sliding-surface layer consisting of a lead alloy which contains copper and tin, and
an additional layer which is disposed between said bearing metal layer and said sliding-surface layer and adjoins the latter and comprises lead, copper, and tin,
said tin in said additional layer being completely bonded to said copper in said additional layer in the form of a copper-tin phase.

13. A sliding-surface bearing as set forth in claim 12, in which the total quantity of tin which is contained in said sliding-surface layer is bonded to copper in the form of a copper-tin phase.

* * * * *